United States Patent
Hammond

(10) Patent No.: US 6,753,023 B2
(45) Date of Patent: Jun. 22, 2004

(54) RICE-FLOUR HYDROLYSATES FAT SUBSTITUTE

(75) Inventor: Neal A. Hammond, Woodland, CA (US)

(73) Assignee: California Natural Products, Lathrop, CA (US)

( * ) Notice: Subject to any disclaimer, the term of this patent is extended or adjusted under 35 U.S.C. 154(b) by 0 days.

(21) Appl. No.: 09/977,106

(22) Filed: Oct. 12, 2001

(65) Prior Publication Data

US 2003/0072843 A1 Apr. 17, 2003

(51) Int. Cl.$^7$ .............................. A23L 1/105; A23P 1/12

(52) U.S. Cl. ..................... 426/44; 426/622; 426/578; 426/448; 426/449; 127/38

(58) Field of Search .............................. 127/1, 23, 32, 127/38, 67, 71; 426/44, 18, 28, 52, 549, 622, 573, 578, 448, 449, 508, 516

(56) References Cited

U.S. PATENT DOCUMENTS

| | | | | |
|---|---|---|---|---|
| 3,930,029 A | * | 12/1975 | Minami et al. | ................ 426/44 |
| 5,492,715 A | | 2/1996 | Greenland et al. | |
| 5,755,890 A | | 5/1998 | Yuan | |
| 5,876,990 A | * | 3/1999 | Reddy et al. | ................ 435/177 |
| 6,017,388 A | | 1/2000 | Yuan | |

* cited by examiner

Primary Examiner—Keith Hendricks
(74) Attorney, Agent, or Firm—Robert Charles Hill

(57) ABSTRACT

A starch hydrolysis food making process comprises mixing rice flour and rice syrup or honey in equal parts, adding amylase enzymes to the mixture, and extruding for a few seconds at an elevated temperature. Water may be added to the rice flour mixture to adjust the final product texture. A second extrusion can be used to adjust the pH. In a second starch hydrolysis method embodiment of the present invention, one part of water is mixed with five parts of rice flour. Then amylase enzymes are added to the mixture and extruded for a few seconds at an elevated temperature. The extrusion products are then packaged as food ingredients.

12 Claims, 1 Drawing Sheet

US 6,753,023 B2

RICE-FLOUR HYDROLYSATES FAT SUBSTITUTE

BACKGROUND OF THE PRESENT INVENTION

1. Field of the present invention

Embodiments of the present invention relate to food substitutes for fats, and more particularly to rice flours, rice syrups, and honey gelatinized by amylase enzymes and extrusion under temperature and pressure to substitute shortening.

2. Description of Related Art

Shortenings and other fats in foods represent very high calorie sources in people's diets. So many people who are trying to reduce their chances of heart disease, lose weight or maintain a healthy weight, try to avoid such fat calories as much as possible. One way to do this has been to substitute animal fats with vegetable fats, e.g., replacing butter with margarine. The margarine traps water in a gel by using proteins and carbohydrates. Another strategy has been to eliminate the fat altogether, but still keep the original taste and texture as much as possible.

Since fats play a very important role in food texture and flavor, the substitutes must closely mimic the behavior of fats in cooking and in the finished food. Various commercial products have been introduced in the United States. For example, in 1996 the Food and Drug Administration (FDA) approved OLESTRA as a fat substitute in food. Other similar fat substitutes include OATRIM, Z-TRIM, and NU-TRIM developed by George E. Inglett, Ph.D., of the USDA.

Chienkuo Ronnie Yuan describes starch emulsifier compositions and methods in two United States Patents, U.S. Pat. No. 5,755,890, issued May 26, 1998, and U.S. Pat. No. 6,017,388, issued Jan. 25, 2000. The methods heat the starch in the presence of an emulsifier and can be further treated to obtain greater than 20% short-chain amylose. But these methods require an emulsifier which adds cost and defeats some of the mouthfeel and other texture qualities being sought. Such Patents are incorporated herein by reference.

A simple pH-adjusted mixture of rice syrup and fruit juices is marketed as FRUITRIM. The shortening called for in various recipes for cakes, breads, and cookies, is suggested by the makers to be replaced with equal amounts of FRUITRIM.

U.S. Pat. No. 5,492,715, issued Feb. 20, 1996, describes a dual function fruit concentrate sweetener and fat substitute. Such Patent is the basis for FRUITRIM. A blend of hydrolyzed starch and a fruit concentrate is suggested where the starch source is hydrolyzed to a 55–65 value dextrose equivalent. The final product is suggested as a replacement for some or all of the fat components in conventional foods. Unfortunately, such methods produce only simple blends that do not resemble fat. Such Patent is incorporated herein by reference.

Prior art starch processes that do not use extrusion require relatively large amounts of water, e.g., 70–80%. Such water is needed to hydrate and rupture the starch molecule. The water also provides heat transfer, a source of water molecules during the hydrolysis reaction in the presence of enzymes, and it aids in the dispersion of the starch.

SUMMARY OF THE PRESENT INVENTION

Briefly, a starch hydrolysis method embodiment of the present invention comprises mixing rice flour and rice syrup, honey or another similar sweetener in equal parts, adding amylase enzymes to the mixture, and extruding for a few seconds at an elevated pressure and temperature. Water may be added to the rice flour mixture to adjust the final product texture. A second extrusion can be used to adjust the pH by inactivating the amylase enzymes. In a second starch hydrolysis method embodiment of the present invention, one part of water is mixed with five parts of rice flour. Then amylase enzymes are added to the mixture for extrusion for a few seconds at an elevated temperature. The extrusion products are then packaged as food ingredients.

An advantage of process embodiments of the present invention is that a method is provided for starch hydrolysis that is quick, uses less water, and operates at higher temperatures.

Another advantage of embodiments of the present invention is that a replacement food product is provided that looks and functions like shortening but contains no fats.

A further advantage of embodiments of the present invention is that a fat-replacement product is provided that includes proteins that can act as emulsifiers.

A still further advantage of the carbohydrate-based food product embodiments of the present invention is that replacing fat on a one-to-one basis reduces the calories/gram by over fifty percent. Fat has nine calories/gram, whereas carbohydrates have four calories/gram.

The above and still further objects, features, and advantages of embodiments of the present invention will become apparent upon consideration of the following detailed description of specific embodiments thereof, especially when taken in conjunction with the accompanying drawings.

DETAILED DESCRIPTION OF THE PRESENT INVENTION

Figure 1:
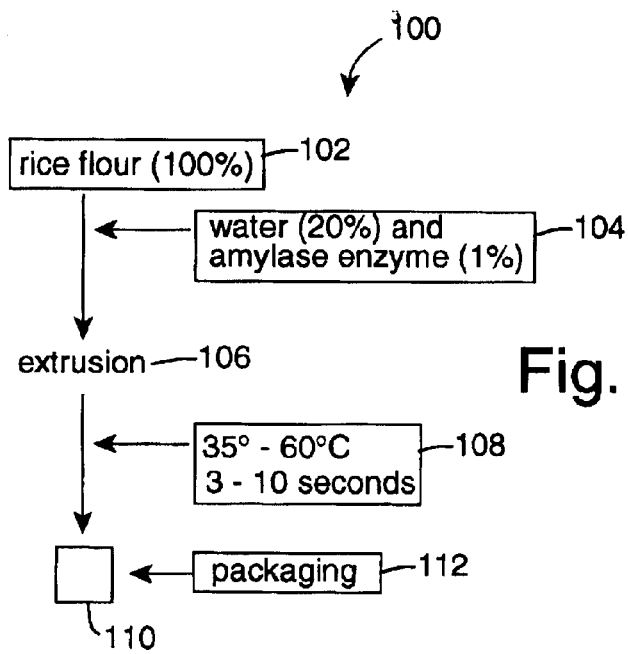
FIG. 1 is a process diagram of a first method embodiment of the present invention that begins with 100% rice flour.

FIG. 1 illustrates a food processing embodiment of the present invention, referred to herein by the reference numeral 100. A starting portion of rice flour 102 is mixed with a slurry 104 of water and amylase enzymes. For example, the rice flour, water, and enzymes are preferably mixed in a ratio of 100:20:1, by weight. These are extruded in a step 106 under time-and-temperature conditions 108, e.g., for 3–10 seconds at 35° C. to 60° C. The high temperature, pressure, and shear conditions that exist during extrusion partially gelatinize the rice flour and cleave at least 20% of the terminal amylase groups from the amylopectin molecules. Ordinarily, high water activity levels of 55%–70% are needed to get good enzyme activity. But here the water content is preferably on the order of 10%–20%, by weight. A resulting paste has a texture and color similar to a solid or semisolid fat, e.g., shortening like CRISCO, and has a bland, neutral taste. A commercial food product 110 results by adding a container packaging 112. The typical melting point of the fat-replacement product is about 120° F.

In particular, the use of 1% alpha-amylase enzymes is preferred in all embodiments of the present invention. However, other amylase enzyme types and other enzymes can nevertheless be used to advantage and produce useful food products contemplated by the present invention.

Figure 2:
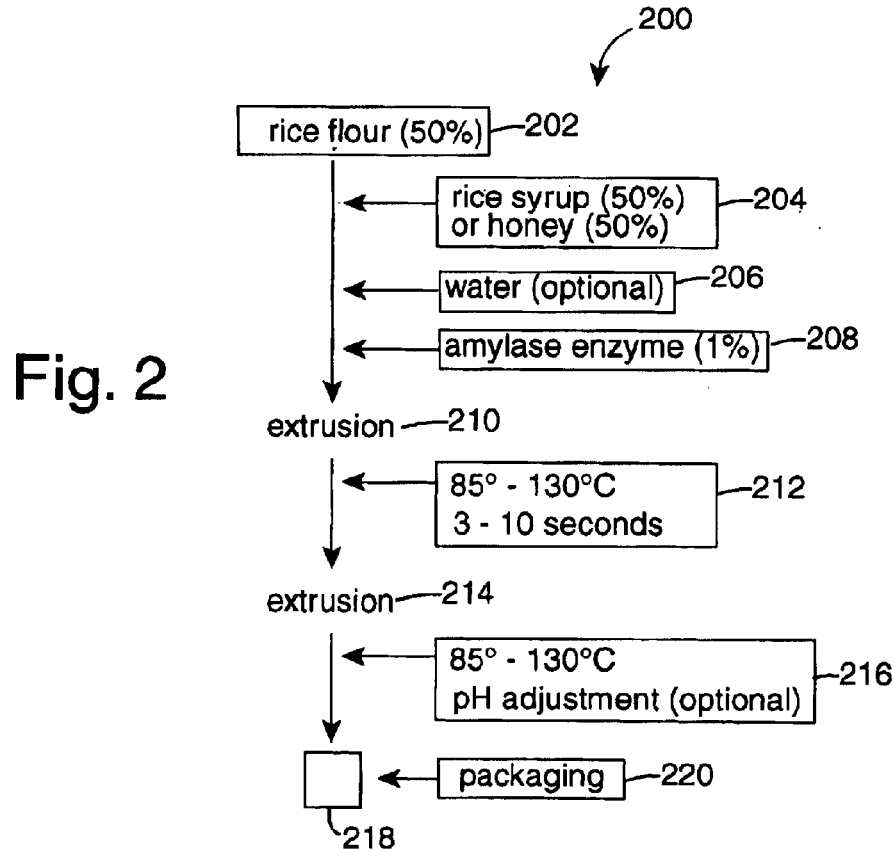
FIG. 2 is a process diagram of a second method embodiment of the present invention that begins with equal parts of rice flour and rice syrup, or equal parts of rice flour and honey.

FIG. 2 illustrates another food processing embodiment of the present invention, referred to herein by the reference numeral 200. A starting portion of rice flour 202 is mixed with a sweetener 204, e.g., rice syrup, honey, corn syrup, or other source of sugars. A portion of water 206 may be added to adjust the final texture of the product. A portion 208 of amylase enzymes are mixed in to promote depolymerization during extrusion, e.g., for a gelatin formation. For example, the rice flour, sweetener, and enzymes are preferably mixed in a ratio of 50:50:1, by weight. The amount of water to add is empirically determined. These are then extruded in a step 210 under time-and-temperature conditions 212, e.g., for 3–10 seconds at 85° C. to 130° C. If a pH adjustment is needed for the final food product, a second extrusion step 214 is used with time-and-temperature conditions 216, e.g., for 3–10 seconds at 85° C. to 130° C. Step 216 inactivates the amylase enzymes. A commercial food product 218 is made ready to distribute to users by adding a container packaging 220. In process 200, the portion of sweetener 204 can be varied 1%–55%, by weight, and still provide good results.

The extruders used can have as few as two zones, to six or more zones. Holding tubes may be placed between a plurality of extruders. Browning of the food products can be reduced or eliminated by cooling the ends of the extruders.

In general, method embodiments of the present invention curtail the amount of fat in finished food products by including granular rice flour hydrolysates as a fat replacement having a dextrose equivalent (DE) of about 5–90. Such hydrolysates are prepared by cleaving at least 20% of amylose groups, preparing a slurry of a granular rice flour containing at least about 20% weight amylopectin and 5%–25% weight water, heating the mass in the presence of amylase enzyme under conditions sufficient to cleave at least about 20% of the terminal amylose groups from the amylopectin molecules, and then cooling to form a product that has the approximate viscosity and texture of solid fat.

Preferably, the initial rice flour ingredient here is a granular unmodified waxy rice flour. The water-enzyme slurry can be varied about 70%–90% weight of the rice flour. Preferably, the slurry is heated under conditions sufficient to cleave at least 40% of the terminal amylose groups. Alternatively, the slurry is heated at or above atmospheric pressure and at a temperature of about 50°–100° C. Different product textures can be achieved by heating the slurry at or above autogenous pressure and at a temperature of about 70°–250° C.

Fats and oils are widely used in food, and there is no chemical difference between them. Fats are solid at room temperature while oils are liquid. Fats, carbohydrates and proteins constitute the three major classifications of food. Fats contain more than double the number of calories per unit weight of carbohydrates or proteins. Fats in the diet are linked with heart disease, cancer, and a wide range of undesirable effects in humans.

However, the taste, mouthfeel, and other organoleptic properties of fat in food are so seductive that it is not an option to simply omit fat from food. Even so, it is worthwhile to reduce fat in food by substituting it with other materials, preferably those that can mimic fat's organoleptic and functional properties. A wide variety of fat replacements and substitutes have been marketed for this purpose, including sucrose polyesters, pectin, carageenan, protein microparticulates, beta-glucans, and hemicelluloses.

However, to date, rice flour derivatives of various types have shown the most promise in serving as acceptable fat replacements. A carbohydrate product that should look and act like fat must have low moisture content, e.g., under 50%.

Rice starch plant material has a polymer chemical composition of thousands of anhydroglucose units ($C_6H_{10}O_5$), and is both a polysaccharide and a carbohydrate. Rice flour molecules exist as essentially unbranched chains consisting predominantly of 1,4-linkages between the anhydroglucose units, known as amylose, and as branched amylopectin chains consisting of both 1,4- and 1,6-linkages. Linear, short chain sections of the amylopectin molecule are connected to the longer backbone, and are terminal amylose groups of about 10–50 anhydroglucose units.

Rice flour occurs naturally in plants in the form of granules having an average size of 5–100 microns, with thousands of individual rice starch molecules tightly bound together. Unmodified rice starch granules are insoluble in cold water, but can be dissolved by heating at a temperature of 70°–90° C. at atmospheric pressure. When the granules swell and rupture a gelatin forms that is deliberately induced in traditional cooking.

Waxy rice is a short-grain type of rice with less than 1% amylose. A favorable soft texture in waffles and pancakes can obtained by using about 5%–10% waxy rice flour. Flour-water pastes show no syneresis or retrogradation in freeze-thaw stability tests, but medium-grain rice flours produce curdled pastes, and long-grain rice flours become rigid sponges. Medium-grain rice flour has a lower amount of amylopectin starch than short grain.

In Japan, rice flours from washed broken rice or milled rice are prepared from both waxy and nonwaxy rice. The flour for rice noodles is pulverized from non-waxy rice with a beater, roller or stamping machine. Rice flours are conventionally used in the preparation of rice noodles, extrusion-cooked baby foods, unleavened breads, rakugari rice cake, senbei and arare rice crackers, uiro rice pudding, and other Japanese rice products. Gelatinized rice flours are also prepared from both waxy and non-waxy Japanese rice. Milled waxy rice is steamed, converted into a dough, and pulverized. The flour is then typically used for making rice cakes.

Extrusion cooking is conventionally used to produce gelatinized waxy rice flour to avoid the tedious and more traditional Mochi process. Extrusion cooking uses rotating screws to force a relatively dry mass down a barrel, e.g., 10–40% moisture. A large motor is used to turn the screws. A restriction at the outlet of the barrel causes the food to pressurize and heat up in the barrel very quickly. Part of the mechanical energy is also used to squeeze the food mass through a shaping die at the barrel outlet. The pressures generated can rise to 350–3000 psi, causing the internal temperature to rise above the normal boiling point of water without the production of steam or loss of moisture. Under such conditions, cereal-based food ingredients will heat to 100–200° in less than two seconds and convert to a homogeneous plasticized mass.

Rice-flour hydrolysates are superior fat replacements, they mimic the organoleptic properties of fat and can be used in a wide variety of foods. The water activity of hydrolysates is low, so biological contamination is not much of a problem.

In food process embodiments of the present invention, a slurry including rice flour is heated for a hydrolytic reaction under conditions that cleave the 1,6-linkages and separate terminal amylose groups from amylopectin molecules, and that do not cause gelatinization of the rice flour granules. At least 20%–40% of the terminal amylose groups should be cleaved, with as many as economically feasible preferably being cleaved. The cleaved terminal amylose residues seem to be responsible for the principle fat-replacement properties of the rice flour hydrolysates. Since the temperature, pressure, and reaction time variables are interrelated, a higher reaction temperature will increase the reaction rate and result in more cleavage.

Embodiments of the present invention have a water content of 5%–25%, compared to 70–80% required for traditional processing. So the simple sugars created during the hydrolysis process have a water activity low enough to mimic the texture of fat without promoting microbiological growth.

Rice-flour hydrolysates are useful in a wide variety of foods, including salad dressings, frostings, glazes, cream fillings, ice creams, margarine, cottage cheeses, yogurts, puddings, candies, sauces, toppings, syrups, cheesecakes, breads, cakes, muffins, pastries, cookies, and crackers. While these hydrolysates are primarily suited for use as fat replacements, they are also useful in other food applications such as replacements for caseinate in cheeses, and in pharmaceuticals and other non-food applications.

Commercial applications include sales to food manufacturers as a direct replacement for either vegetable shortening or animal fat. This would create a fat-free product or a reduced or low fat product with reduced calories. Also, because it is in the same functional form as shortening it does not have to be rehydrated. The present invention is very bland so it does not change the flavor of the finished product. Fat-replacement products of the present invention can be made in both solid and liquid form, depending on the functional requirements of the user.

In U.S. Pat. No. 5,492,715, hydrolysis or polymerization is not used. It is just a mix and blend procedure. But in embodiments of the present invention the properties of the rice flour are being changed. The rice syrup enhances the handling characteristics of the product and also increases the heat transfer during extrusion.

Another unique feature is the enzyme hydrolysis with a very low moisture content. The standard in the corn and rice industries is to do dry substance phases (DSP) of 30%–45% moisture. Usually you need high water activity levels 55%70% is usually needed to get good enzyme activity. But with embodiments of the present invention the water content is 10%–20%.

In working with food systems you want to develop foods that will contain fat, and embodiments of the present invention can mimic that fat. One example is sausage, where fat is added to enhance the flavor and texture.

In tests, medium grain rice flour was passed through a Wenger TX-57 extruder with some added water but no added enzymes. These were control runs. The flour and water were continually mixed together as they passed through the extruder. There were different temperatures in each zone of the extruder. There was no significant hydrolysis. In other tests, enzymes were added and the amount of water was varied. Such tests were run at 100–2000 psi, and nominally about 500 psi.

There is a relationship between pressure and temperature, so a moderate pressure of 500 psi can be expected to generate the desired temperatures. In one test, the temperature increased as the water content was decreased. The product discharge temperature of 100° C. or 94° C. is higher than the temperature within the last zone of the extruder because a steam jacket was placed near the end of the last zone that raises the temperature and thus inactivates the enzyme. The enzyme becomes inactive around 90° C., and, of course, water boils at 100° C.

In some tests, monoglyceride and lecithin emulsifiers were added. The monoglyceride reacts with the starches. The desired range of DP<8 to DP>7 runs of 33.5–66.5 in the low range, to 66–34 in the high range. In this range from DP>7 of 33 to 66%, achieved through extrusion, the product is much more functional than just rice flour, and also more flexible. And the glucose, maltose, multotriose, maltotetrose, multopentose, multohexose, and multoheptose molecules all act as fat replacers.

The present invention is a combination of hydrolyzed rice flour and rice syrup that mimics fat in texture and flavor. This combination functions very similar to and sometimes better than fat in certain applications. The prior art has not been using extrusion for the hydrolysis of rice flour. Such extrusion promotes a short time conversion of the flour in the presence of an enzyme.

One extrusion machine used in tests was a Bonnet 2⅛" single screw extruder. Such machine was reconfigured to include a steam jacket around the barrel. The Bonnet 2⅛" single screw extruder is ordinarily used for polyethylene, e.g., melting resin and then extruding it. Stainless steel was used throughout the machine, as is good manufacturing practice in the food industry. In use, the rice flour, rice syrup and water are fed into the extruder, and the screw compresses the material under high temperature and sheer, and exits the material as a syrup at 220–230° F. A cooler can also be added after the extruder to avoid product browning and carmelization. The sugars convert until cooled down, which changes the color but not the functionality. Another extruder as the cooler itself could be used. This product would exit at 90–100° F. as a creamy-white semi-solid that could be cut or scooped out, like shortening.

An important point is that just about any type of extrusion device can be used. The Wenger extruder has twin screws. Another type tested had only one screw. Both types had to be adjusted for the proper temperature and pressure.

Although particular embodiments of the present invention have been described and illustrated, such is not intended to limit the present invention. Modifications and changes will no doubt become apparent to those skilled in the art, and it is intended that the present invention only be limited by the scope of the appended claims.

What is claimed is:

1. A food-making process for a fat substitute, comprising the steps of:
   starting with a rice flour;
   adding water to the rice flour;
   adding an alpha-amylase enzyme to the rice flour and the water to form a slurry;
   blending a sweetener with said rice flour in said slurry;
   extruding a hydrolyzed rice flour from said slurry;
   wherein, enzyme activity initiated by pressures and temperatures present in the step of extruding hydrolyses said rice flour, and such hydrolyzed rice flour has a water content of 5%–25%, by weight.

2. The food-making process of claim 1, further comprising the step of:
   substituting said hydrolyzed rice flour for a fat in any food product.

3. The food-making process of claim 1, further comprising the step of:

adding said hydrolyzed rice flour instead of shortening in any food product.

4. The food-making process of claim 1, wherein:
the step of extruding accelerates a conversion of said rice flour into said hydrolyzed rice flour in the presence of said alpha-amylase enzyme.

5. The food-making process of claim 1, wherein:
the step of extruding produces simple sugars in said hydrolyzed rice flour with a water activity low enough to mimic the texture of fat and which will not support microbiological growth.

6. A The food-making process of claim 1, wherein:
the step of extruding is such that said hydrolyzed rice flour resembles the appearance of shortening, and is a combination of water, flour simple sugars, and complex carbohydrates that have less than half of the calories of fat.

7. The food-making process of claim 1, wherein:
the step of extruding is such that said hydrolyzed rice flour includes proteins as emulsifiers.

8. The food-making process of claim 1, wherein:
the step of extruding does not include an emulsifier in said slurry.

9. The food-making process of claim 1, wherein:
the sweetener is rice syrup.

10. A food-making process for a fat substitute, comprising the steps of:
starting with a rice flour;
adding water to the rice flour;
adding an alpha-amylase enzyme to the rice flour and the water to form a slurry;
extruding a hydrolyzed rice flour from said slurry within 3–10 seconds;
wherein, enzyme activity initiated by pressures and temperatures present in the step of extruding hydrolyses said rice flour, and such hydrolyzed rice flour has a water content of 5%–25%, by weight.

11. The food-making process of claim 10, wherein:
the step of extruding is conducted within a temperature range of 35° C. to 60°.

12. A food-making process for a fat substitute, comprising the steps of:
starting with a rice flour;
adding water to the rice flour;
adding an alpha-amylase enzyme to the rice flour and the water to form a slurry;
extruding a hydrolyzed rice flour from said slurry;
wherein, enzyme activity initiated by pressures and temperatures present in the step of extruding hydrolyses said rice flour, and such hydrolyzed rice flour has a water content of 5%–25%, by weight; and
extruding a second time to inactivate said alpha-amylase enzymes and thereby reduce the pH of said hydrolyzed rice flour.

* * * * *